Figure 1:
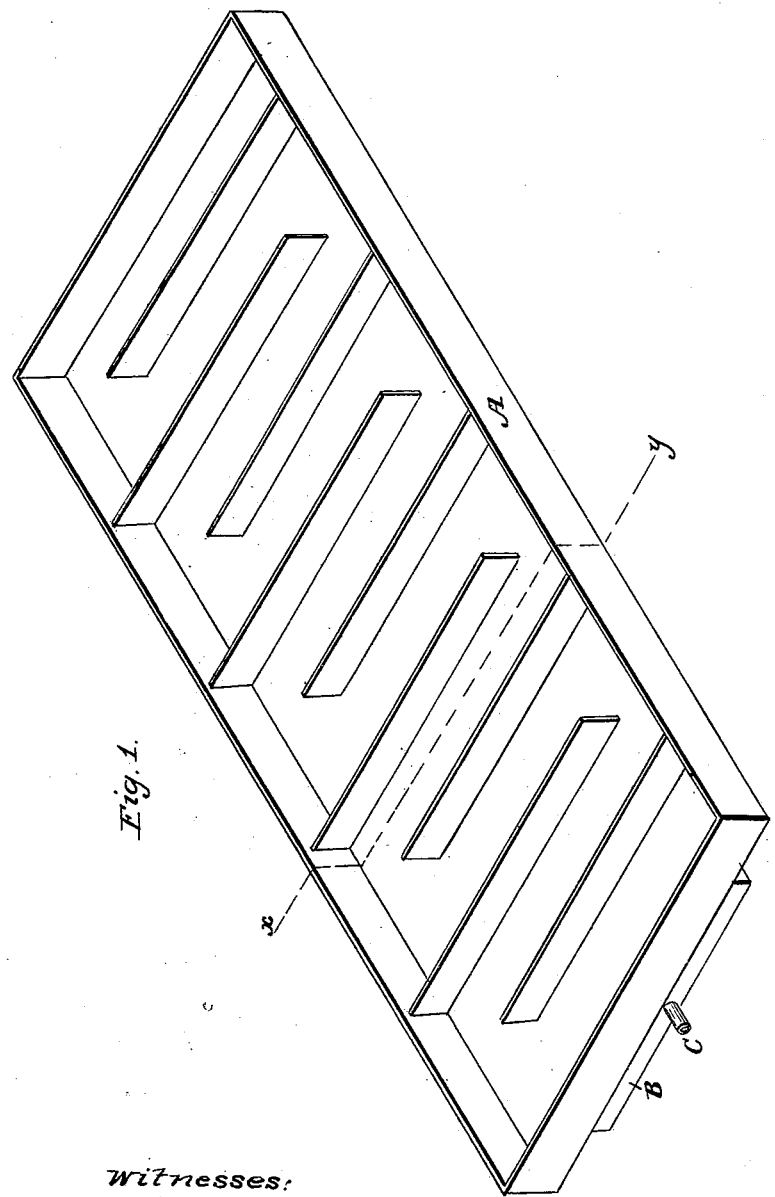
Figure 2:
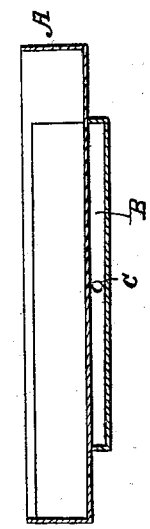

C. & D. MERCER.
Evaporator.

No. 53,229.

Patented March 13, 1866.

Witnesses:
M. Kimble
Samuel H. Milligan

Inventors:
Charles Mercer
David Mercer

UNITED STATES PATENT OFFICE.

CHARLES MERCER AND DAVID MERCER, OF STRICKERSVILLE, PENNSYLVANIA, ASSIGNORS TO BLYMYER, BATES & DAY.

IMPROVED EVAPORATOR.

Specification forming part of Letters Patent No. 53,229, dated March 13, 1866.

*To all whom it may concern:*

Be it known that we, CHARLES MERCER and DAVID MERCER, of Strickersville, Chester county, Pennsylvania, have invented a new and useful Improvement in the Mode of Applying Steam to Evaporating-Pans, of which the following is an accurate description.

Like letters refer to like parts.

A may be any evaporating-pan. In the illustrations, Cook's is preferably used. B is a steam-chamber, so constructed beneath the bottom of the pan that the sides of the latter may project several inches beyond it in order that while the central portion is intensely heated by the steam, the sides of the pan may remain comparatively cool, thereby affording a quiet place in the pan to which the scum may retire and rest.

To prevent the waste of heat the pan may be bedded upon some non-conducting substance; or, if portability is desired, the bottom of the steam-chamber may be made of wood and lined with metal.

Steam connection is made at C and the condensed steam discharged at the opposite end of the pan.

The advantages of this mode of applying steam over the coil in long pans are—

First, all parts of the pan in immediate contact with the steam-chamber are heated equally and at the same instant. This equability of temperature is constantly maintained and insures a uniform article of sirup. In the use of a coil the condensation of the steam in passing through it renders it impossible to secure an equal heat throughout the pan, nor can the regularity of the heat be so readily maintained.

Second, coils become coated by a deposit from the cane-juice, and require a removal every few hours, not only that the coil but the pan itself may be cleaned. This coating impairs the heating capacity of the coil and occasions vexatious delay in removing. With our improvement the pan only requires cleaning, and this can be done by the use of a stiff broom during the process of boiling and without any loss of time.

Third, the cheapness with which this steam-chamber may be constructed, as compared with a coil, is a very great advantage and brings it within the reach of every cane-grower.

Fourth, the interior of the pan is left unobstructed for the work of the operator.

We do not claim the application of steam to the central part of the pan, leaving cool sides for the deposit of the scum, as that is not new; but What we do claim as new, and for which we wish to secure Letters Patent, is—

1. Applying the steam beneath the bottom of the pan in such a manner as to heat the center and leave cooling sides for a deposit or rest of the scum.

2. Applying steam beneath an open pan so that the interior thereof shall be unobstructed for the work of the operator.

3. The combination, with evaporating-pans, of a steam-chamber constructed as described.

CHARLES MERCER.
DAVID MERCER.

Witnesses:
THOS. MERCER,
HATTON MERCER.